UNITED STATES PATENT OFFICE.

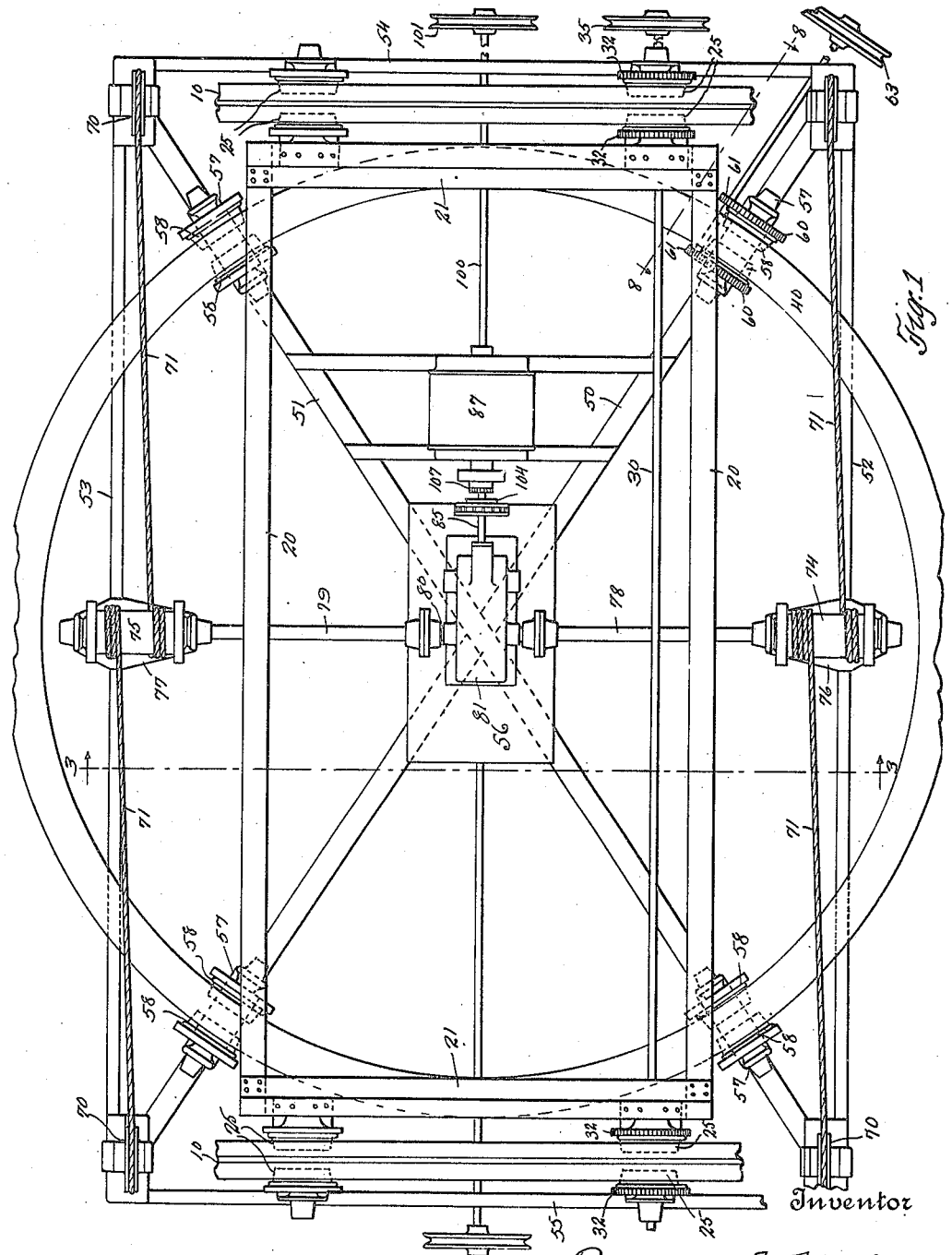

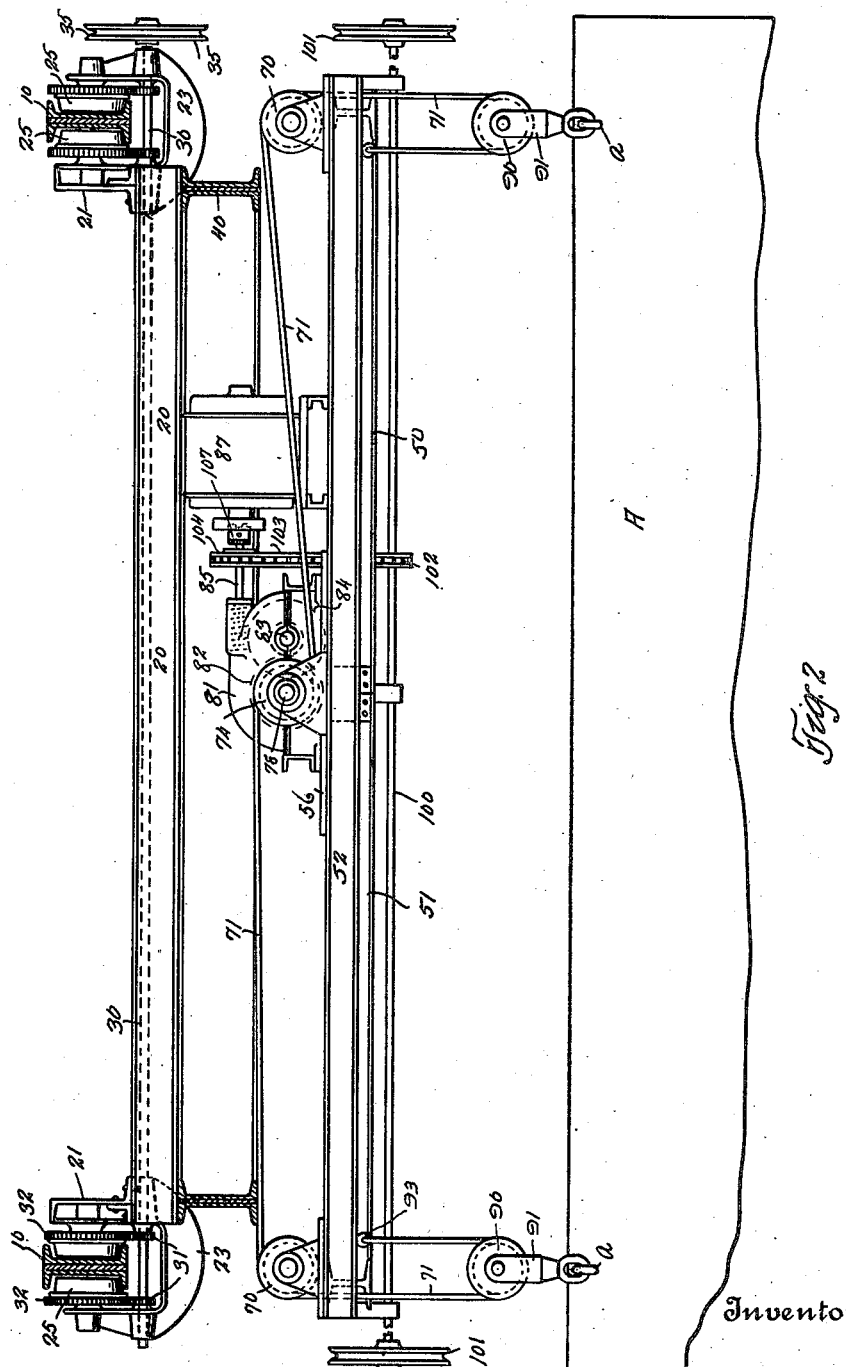

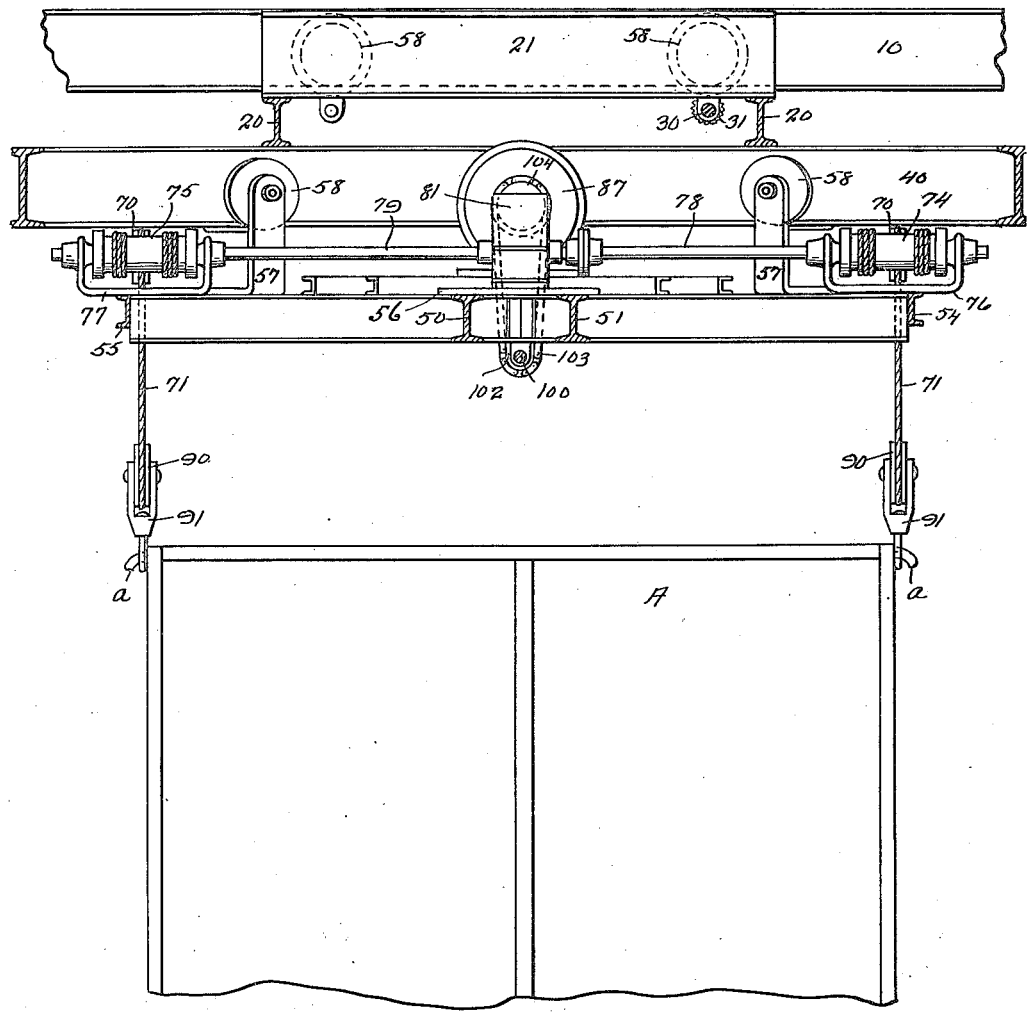

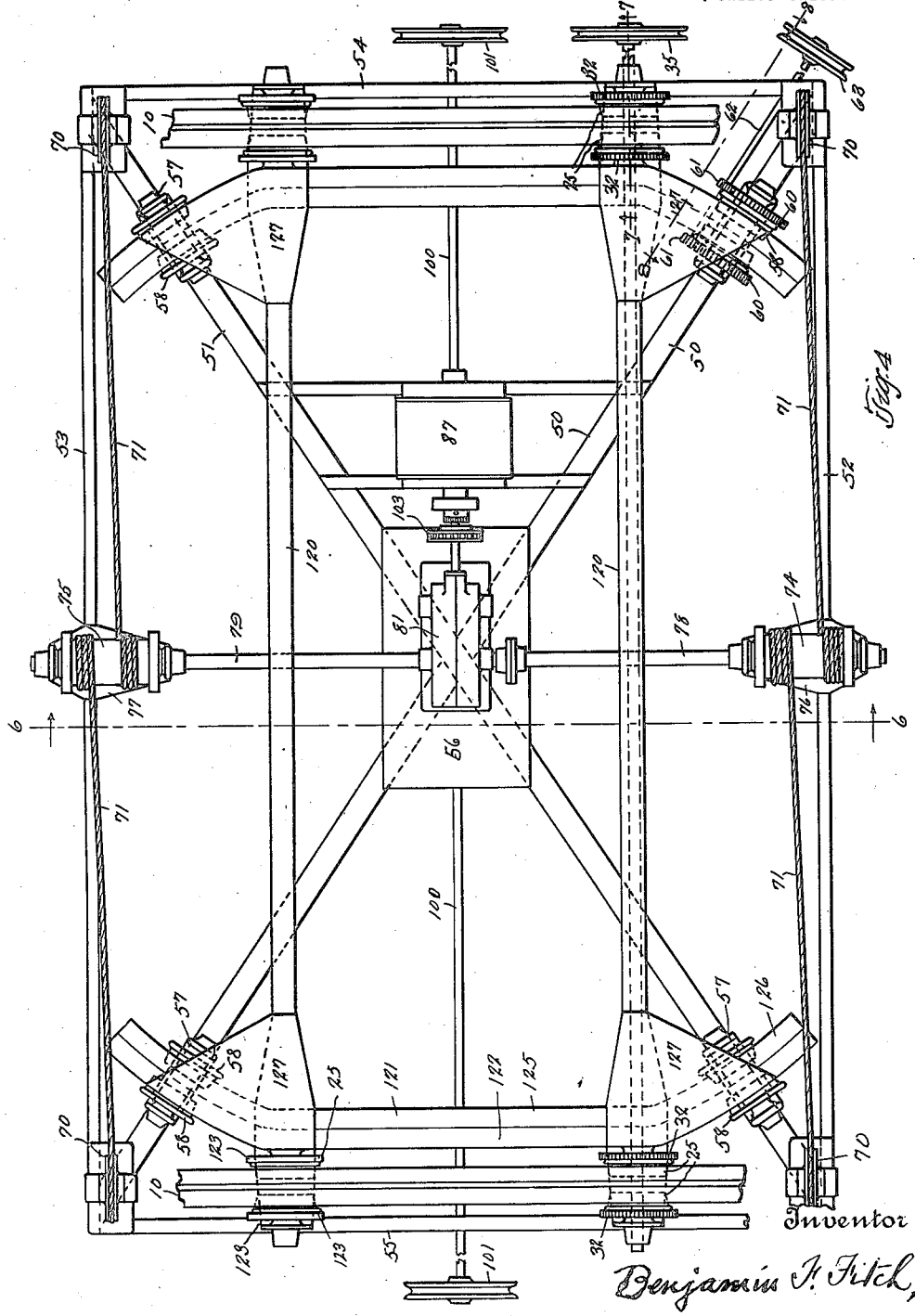

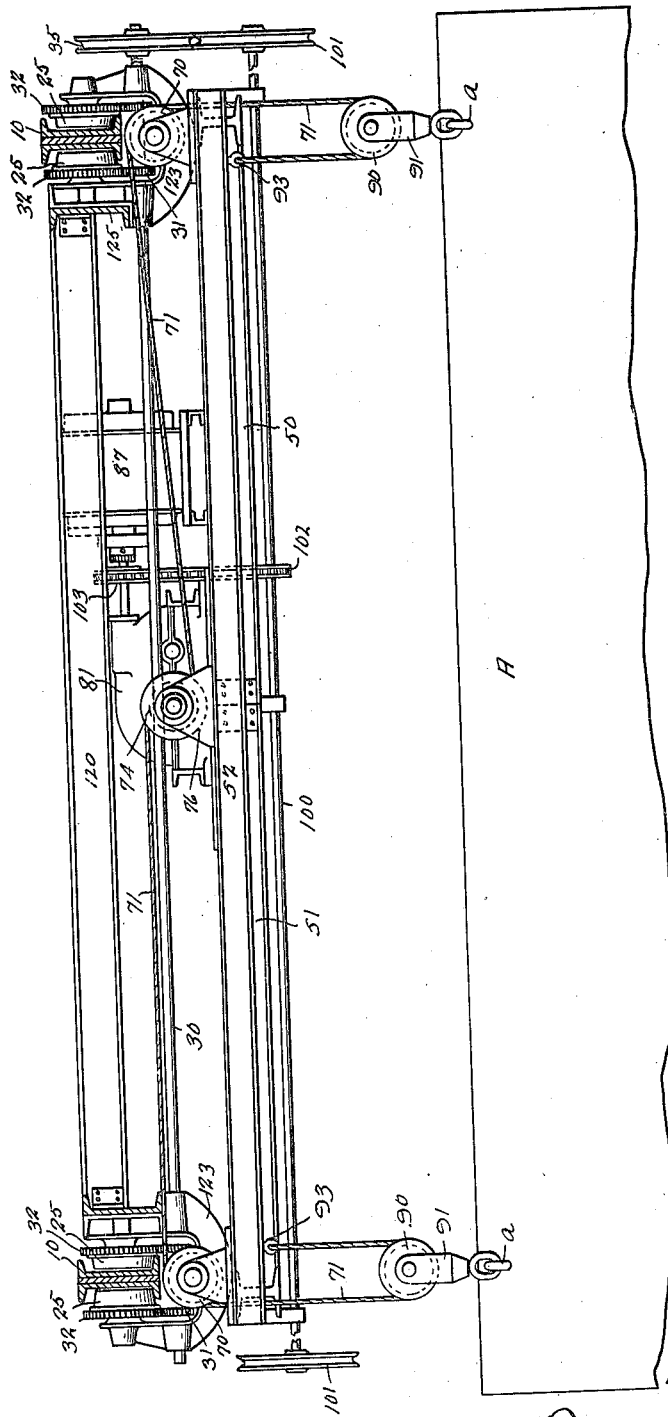

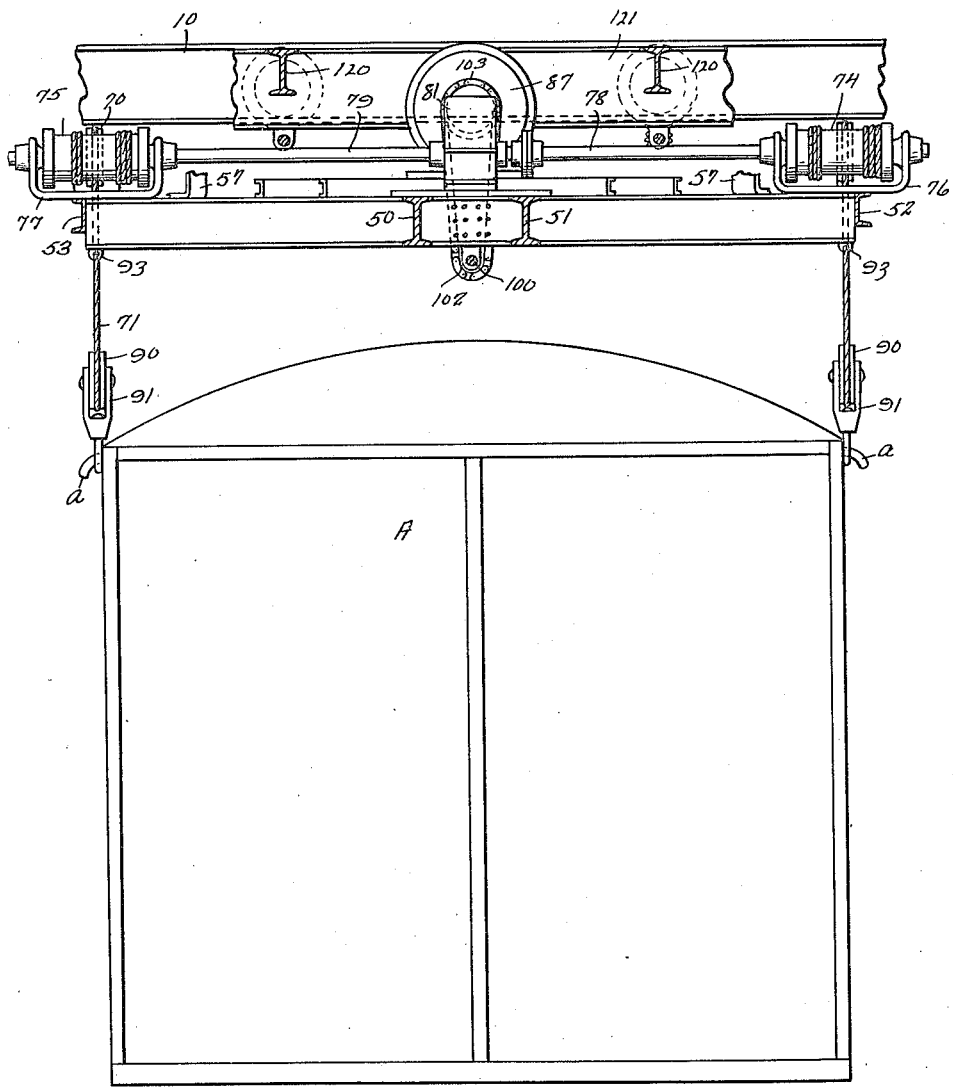

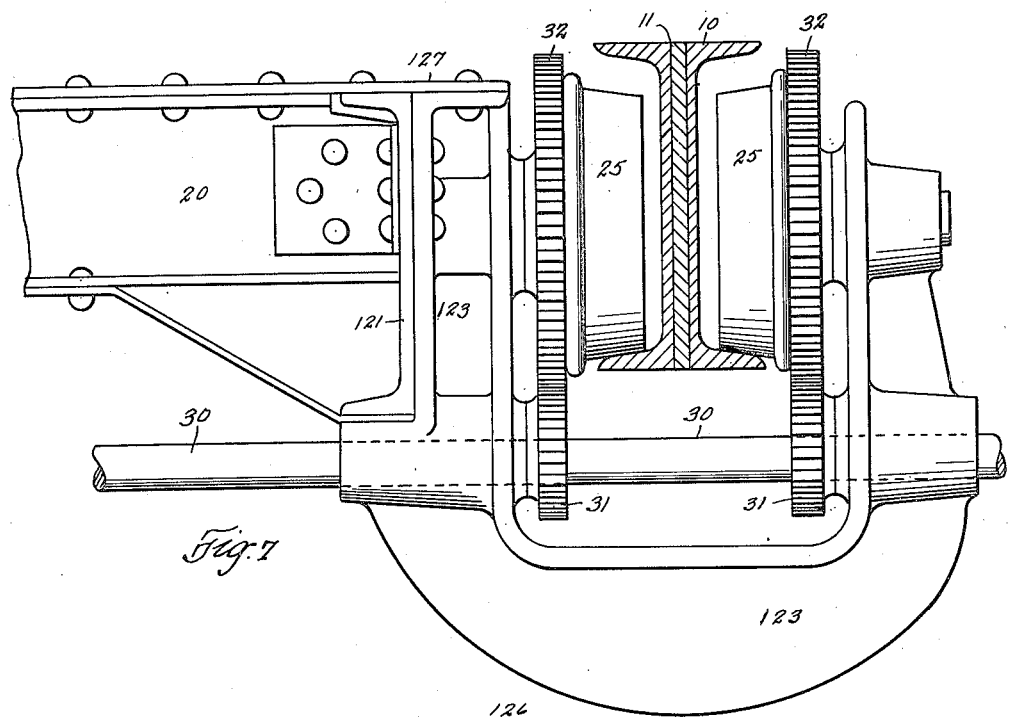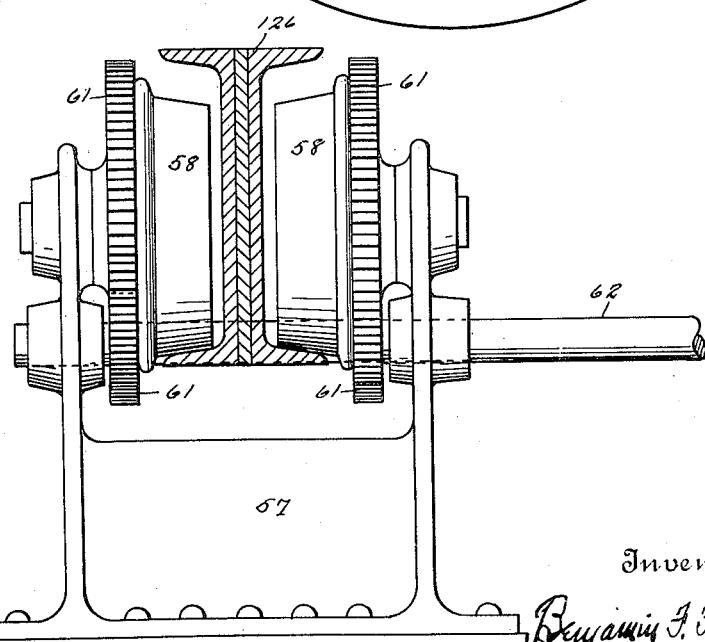

BENJAMIN F. FITCH, OF EVANSTON, ILLINOIS, ASSIGNOR TO THE MOTOR TERMINALS COMPANY, OF CLEVELAND, OHIO, A CORPORATION OF OHIO.

TRAVELING CRANE.

1,419,129.  Specification of Letters Patent.  Patented June 13, 1922.

Application filed April 24, 1919. Serial No. 292,513.

*To all whom it may concern:*

Be it known that I, BENJAMIN F. FITCH, a citizen of the United States, residing at Evanston, in the county of Cook and State of Illinois, have invented a certain new and useful Improvement in Traveling Cranes, of which the following is a full, clear, and exact description, reference being had to the accompanying drawings.

This invention relates to a traveling crane or bridge crane of a novel type adapted to elevate a load and turn it about a vertical axis as well as transport it. This crane is particularly well adapted for raising and transporting removable bodies from automobile trucks, or depositing them on trucks, since it does not require such trucks to be in any definite position with reference to the edge of a platform or other structure with which the truck body is to cooperate. My traveling crane may accordingly well be used in connection with the system of transporting freight between railroad terminals, described and claimed in my Patent No. 1,275,145, issued August 6, 1918.

My traveling crane is also well adapted for transporting removable bodies between an automobile truck and the interior of a freight house, since the ability to turn the body on a vertical axis enables it to be taken from a truck standing cross wise of a doorway and then turned more or less at right angles to the truck and shifted through the doorway. Of course it is equally adaptable for the reverse operation of carrying the body from inside the freight house through the doorway and depositing it on a truck outside.

For accomplishing the above results, I have provided a traveling frame from which is suspended a turn table equipped with raising mechanism having a plurality of depending flexible members adapted to engage the load at separated points. My invention comprises such a structure broadly as well as the more particular adaptation thereof, illustrated by the drawings hereof and hereinafter more fully described.

In the drawings, Fig. 1 is a plan of one embodiment of my traveling crane; Fig. 2 is a side elevation partly in section of the same embodiment; Fig. 3 is a section on the line 3—3 of Fig. 1; Fig. 4 is a plan of another embodiment of my traveling crane; Fig. 5 is a side elevation partly in section of the embodiment shown in Fig. 4; Fig. 6 is a cross section on the line 6—6 of Fig. 4; Fig. 7 is an enlarged vertical section on the line 7—7 of Fig. 4; Fig. 8 is an enlarged section on the line 8—8 of Figs. 1 and 4.

Referring first to the particular embodiment shown in Figs. 1, 2, 3, and 8, 10, 10 indicate two supporting overhead trackways of an I-beam nature which are arranged parallel to each other and suitably supported from above or at their ends, as for instance, by the roof girders, columns, walls of a freight house. The specific trackway shown is made of two channel beams and an interposed plate 11 to obtain sufficient strength and stiffness, though this is immaterial to the invention.

The main frame of the traveling crane, as shown in the figures referred to, consists of a horizontal open rectangular member, shown as composed of I-beams or channel bars 20, extending longitudinally of the crane (that is, transversely of a trackway) and other structural members 21, extending transversely of the members 20 and secured to them. As shown, these members 21 are Z-bars which engage the top flanges of the bars 20 and are riveted to them. Secured to the vertical webs of the Z-bars and also to their top flanges are suitable castings 23, of an approximate U-shape, extending beneath the trackways 10 and up onto the outer sides thereof. Near their upper ends the castings carry studs on which are journaled supporting wheels 25 which track on the lower flanges of the trackways 10. As shown, there are four of these U-shaped castings adjacent to the four corners of the frame, each casting carrying two wheels, riding on the two flanges of the corresponding trackway.

The structure described may be very light and at the same time strong and provides the desired open frame which is adapted to travel on the trackways. To effect such travel, I prefer to positively drive two pairs of the supporting wheels as the front corners of the structure. For this purpose I have provided a through shaft 30, journaled in bearings in the U-shaped brackets 23 and carrying pinions 31 which mesh with gears 32 on the corresponding wheels 25,—see particularly Fig. 7. A suitable hand chain wheel 35 or other means may be provided for rotating the shaft 30 and thus causing the frame to travel along the trackways.

The main frame described suspends a supplemental trackway on which the turntable with its hoisting mechanisms travels. As shown in Figs. 1, 2 and 3, this supplemental trackway is a completely annular member 40, built in I-beam form by channel bars and an interposed plate, and secured to the under face of the main beams 20 of the upper frame and hence shiftable with it as a unit.

The turntable is a built-up open frame shown as consisting of the diagonal I-beams 50 and 51 and channel bars 52, 53, 54 and 55 connecting the ends to the diagonal members. One of the diagonal beams is preferably a through beam and the other is made in two parts abutting the web of the through beam and connected to it by clips and rivets, and reinforced by a gusset plate 56. Each of the beams 50 and 51 carry suitable brackets 57 which rise on the opposite sides of the curved trackway 40 and the arms of these brackets carry wheels 58 in pairs, riding on the opposite flanges of the trackway 40.

It will be understood from the description given that the turntable frame is supported on the circular trackway 40 and hence may swing on it about a vertical axis. To cause this rotating movement, I provide one of the pairs of wheels 58 with gears 60 (see particularly Fig. 8) which mesh with pinions 61 on a shaft 62 which carries suitable means as a wheel 63 for rotating it. The rotation of this wheel will accordingly give the turntable structure a rotative travel on the main supporting frame. The turntable structure carries suitable hoisting mechanism which may engage and raise the load, and thereafter the operation of the wheel 63, as for instance, by a hand chain, extending over it, may turn the load about its axis, then the manipulation of a chain extending over the wheel 35 may carry the frame with the turned load lengthwise of the trackway.

Any suitable hoisting mechanism, having raising members depending at a plurality of points, may be carried by the turn table. For raising the removable body of an automobile, however, I deem it desirable that there be four elevating cables depending from the four corners of the turntable and provided with eyes or hooks adapted to engage the body at four points. To enable this operation, I provide at each of the four corners of the suspended structure a sheave 70 and I arrange four cables 71 to extend over the respective sheaves and be connected with winding mechanism carried by the suspended frame.

To wind in or pay out the cables 71, I have shown two drums 74 and 75 mounted on shafts 78 and 79 which are journaled in brackets 76 and 77 carried by the frame members 52 and 53. The aligned shafts 78 and 79 from the respective drums lead to a central winding mechanism. Thus I have shown these shafts coupled to a shaft 80 which is mounted in a suitable housing 81 on and rotating with the gusset plate 56 and, within the housing shaft 80, carries a spur gear (indicated in Fig. 2 by the dotted lines 82) meshing with a spur pinion therein which is on a shaft 83. On this latter shaft is a worm wheel 84 meshing with a worm on the shaft 85 which extends out of the housing. Suitable means are provided for rotating this worm shaft, as for instance the motor 87 having its armature connected with the worm shaft.

It follows from the construction described, that when the motor 87 is rotated the four cables 71 are elevated or lowered simultaneously and equally over the sheaves 70, according to the direction of rotation. I prefer to have each of the cables 71 depend in a bight and carry the wheel 90 of a movable pulley, the strap 91 of which has means to engage the body or load. The idle end of the cable 71 is suitably anchored, as shown at 93, to the turntable frame. Figs. 2, 3, 5 and 6 indicate at A the body of an automobile truck provided adjacent to the upper corners with hooks $a$, adapted to be engaged by eyes of the straps 91.

With such a structure as described, if an automobile truck having a removable body is driven beneath the trackway 10 the traveling crane on the trackway may be shifted to come over the truck and then the turntable operated to bring the four pulleys 90 directly over the hooks $a$, and then the hoisting mechanism operated, if necessary, to lower the movable pulleys so that their eyes may engage the hooks. Then if the motor is operated the body will be raised and at the same time may be maintained level. Then by operating the hand chain wheel 63, the body may be swung about a vertical axis to position it properly with reference to a doorway, platform or other stationary structure. To transport the positioned body, the hand chain wheel 35 is operated, this operation being either before or after or simultaneously with the operation of the hand chain wheel 63, according to conditions.

To enable the load to be elevated by hand, should the motor be out of order or no current available, I provide an alternative driving mechanism for the worm shaft 85. This mechanism consists of a shaft 100 mounted in the turntable frame and having preferably at its two ends hand chain wheels 101 and intermediately having a sprocket wheel 102 meshing with a sprocket chain 103 which extends over a sprocket wheel 104, loose on the shaft 85. A suitable dog clutch indicated at 107 is adapted in one position (shown in Fig. 2) to clutch the armature to the worm shaft 85 and in the other position to clutch the wheel 104 to the shaft 85. Accordingly if the electric operation is not available, this clutch is simply thrown (as by loosening its set screw and shifting it by hand) to disconnect the armature and connect the shaft 100 with the worm, and then the raising may be accomplished by the hand chain wheels 101.

The structure described is adapted to engage a load, raise it, turn it any number of degrees desired about a vertical axis and transport it. There is no limit to the amount of turning as the body could be turned entirely around. Ordinarily, however, about a quarter turn is sufficient to take a body standing crosswise of a doorway and turn it into a position to pass through the doorway. For many uses, however, a less turn than a quarter turn is sufficient, as for instance, where it is only desired to shift the body slightly to avoid requiring an automobile truck being accurately parallel or at right angles with the overhead trackway. A simplified structure for accomplishing this partial turn is shown in Figs. 4 to 6 inclusive, and will now be described.

As shown in Figs. 4 to 6, we have the rectangular frame composed of structural members 120 and 125 four brackets 123 (as shown in Fig. 7) carried by these members and four pairs of wheels 25 carried by the brackets, these wheels riding on the trackway 10. In this case, however, the end beams 125 of the frame are extended and curved concentrically at 126 to provide a partially circular support for the turn table. These end beams 125 are shown as outwardly facing channel beams 121 and 122 secured together back to back, thus making a built-up I-beam structure. To the top flanges of these channels are preferably riveted gusset plates 127 for the purpose of strengthening or stiffening the overhanging or cantilever ends of the transverse beams.

The overhanging or cantilever portions of the transverse beams 125 are concentric about a central point so that they provide portions of a circular trackway adapted to support a turn table which has a limited movement about a vertical axis intersecting such point. The turn table in this case is similar to that already described and comprises the diagonal beams 50 and 51, the four boundary members 52, 53, 54 and 55, the brackets 57, supporting wheels 58, elevating cables 71, winding drums 74, 75 and motor gearing as already described. The motor mechanism and also the substitute hand shaft 100 with its wheels 101 is the same as already described. As before, a hand chain wheel 63 on the diagonal shaft 62, operates the pinions 61 which mesh with the gears 60 on one pair of wheels 58 for swinging the turntable structure.

While the turntable is swung in the same manner as described with reference to the first embodiment, the amount of swing is dependent on the extent of the curved portions of the overhanging trackway 126. This limited swing however, is sufficient for the placing of a body on a truck chassis which is approximately parallel, though not strictly so, to the edge of a platform which the I-beams overhang. The equipment is therefore, well adapted for use as a traveling hoist structure in such an unloading system as shown in my prior patent referred to, where pairs of I-beam trackways project at right angles across a platform and over an automobile runway alongside of the platform.

The embodiment shown in Figs. 4, 5 and 6 has the advantage of cheaper construction, greater compactness across the crane and less depth, so that to raise the load to a given height the supporting trackways do not need to be so high.

Fig. 7 illustrates the wheel carrying bracket, embodied specifically on the structures shown in Figs. 4, 5 and 6, though this is similar to the corresponding structure in Figs. 1, 2 and 3. The bracket 123 in this case, which carries the studs for the wheels 25 and also carries the shaft 30 having the pinions 31, is shown as abutting the outer face of the beam 121 and riveted directly to it and also to the top plate 127, a portion of the beam 122 being omitted where this bracket is located.

It will be seen that whether the invention is embodied in the form of Figs. 1, 2 and 3 or that of Figs. 4, 5 and 6, it is simple in construction, being built out of rolled shapes with suitable riveting, and is thus light and strong. The raising mechanism is simple and efficient, whether operated electrically or by hand, provides the desired reduction in gearing and is adapted to maintain the load level and steady during raising or lowering. The shifting of the turntable on its trackway, and the travel of the crane itself along its trackway, are readily accomplished by the manipulation of the corresponding hand chains. By locating the two hand chain wheels 35 and 63 at the same front corner of the structure, one man may readily operate the two claims without materially altering his position. In this location the operator has an uninterrupted inspection of one end, one side, and three corner brackets of the body, and may thus place it on the truck very readily. Moreover the hand chains are both out of the way of the body being elevated, turned or shifted.

Having thus described my invention, what I claim is:

1. The combination, with a frame suspended from an overhead trackway and having supporting wheels, a curved trackway, a second frame having supporting wheels riding on said curved trackway, so that the second frame may turn about a vertical axis, four flexible members depending from said second frame adjacent the four corners of a rectangle, and mechanism for simultaneously raising the said flexible members with a uniform velocity.

2. In combination, an overhead trackway, a main frame adapted to travel thereon, a curved trackway carried by the main frame, a supplemental frame rotatably suspended by the main frame by means of wheels carried by the supplemental frame and adapted to travel on the trackway, and means connected with said wheels whereby the supplemental frame may be rotated.

3. In a structure of the character described, the combination with a frame having supporting wheels, of a curved overhead trackway carried thereby, said trackway comprising a depending flanged member, and wheels mounted on radial axes and adapted to travel on the flange of said members.

4. In a structure of the character described, the combination of a main frame, supporting wheels carried thereby and adapted to ride on an overhead trackway, a curved trackway carried by said frame, said trackway comprising a member having upper and lower flanges, a supplemental frame having wheels traveling on the lower flanges, and hoisting mechanism depending from said supplemental frame.

5. The combination of an overhead trackway, a main frame adapted to travel thereon, a curved trackway carried by the main frame, a supplemental frame below the trackway, a plurality of sets of wheels mounted on radial axes and connecting the supplemental frame with the main frame, and a drive shaft connected with one set of wheels for rotating the supplemental frame.

6. The combination with a rectangular frame, wheels carried thereby in pairs substantially at the corners of the frame, a curved trackway carried by the frame and having lower flanges, a substantially rectangular supplemental frame beneath the rectangular frame, radial wheels riding on said flange, cables depending from points adjacent the corners of the supplemental frame, and mechanism for winding in said cables.

7. The combination of a main frame, supporting wheels carried thereby and adapted to travel on a trackway, a supplemental frame, supporting wheels carried by brackets on the supplemental frame, adapted to ride on a trackway depending from the main frame, means for rotating one of the wheels on the main frame to shift the whole structure, a shaft geared to one of the supplemental wheels to turn the supplemental frame on the main structure, and hoisting members depending at separated points on the supplemental frame.

8. The combination of a main frame, supporting wheels carried thereby and adapted to ride on an overhead trackway, means for rotating some of the supporting wheels to shift the main frame, a supplemental frame connected with the main frame by means of wheels and a trackway, a member geared to one or more of the last mentioned wheels to turn the supplemental frame about an axis, a pair of flexible raising members depending from the supplemental frame, and mechanism on the supplemental frame and below the trackway for raising said flexible members simultaneously.

9. The combination with an overhead trackway, of a main frame having supporting wheels riding on said trackway, a rotatable supplemental frame having diagonal supporting members therefor, sets of wheels positioned on the supporting member and connecting the supplemental frame to the main frame, means connected with one of the sets of wheels for turning the supplemental frame, sheaves carried by the supplemental frame, cables extending over said sheaves, and a drum and a gear for winding in said cables.

10. The combination, with an overhead trackway, of a main frame, having supporting wheels riding on said trackway, a rectangular supplemental frame, wheels and a trackway connecting the supplemental frame with the main frame, means carried by the supplemental frame for rotating one of said last mentioned wheels, four sheaves carried at the four corners of the supplemental frame, cables extending over said sheaves, and means carried by the supplemental frame for simultaneously winding in said cables.

11. The combination of an overhead trackway, a main frame having pairs of supporting wheels riding on said trackway and itself carrying a trackway, a supplemental frame having wheels riding on a trackway carried by the main frame and having four sheaves, four raising cables extending over said sheaves, two drums mounted on a supplemental frame each for winding in a pair of said cables, a motor and a hand operated device each mounted on the supplemental frame and geared with both drums.

12. The combination, with a supporting frame, wheels carried thereby, of a supplemental frame suspended from the supporting frame in a manner to allow the center of the supplemental frame to turn about a vertical axis, raising mechanism carried by the supplemental frame, motor mechanism adapted to operate the raising mechanism, a hand operated device rotatable with the supplemental frame, and a clutch adapted to connect it with the raising mechanism.

13. The combination of a main frame, supporting wheels carried thereby, a supplemental frame carried by the main frame in a manner so that the center portion thereof may turn about a vertical axis, four elevating cables extending over four sheaves carried by the supplemental frame, winding mechanism for the cables, motor mechanism therefor, hand raising mechanism carried by the supplemental frame, and means for clutching either of the last mentioned two mechanisms with the raising mechanism.

14. The combination, with a main frame, supporting wheels carried thereby, a trackway carried thereby, a supplemental frame having wheels riding on said trackway, hoisting mechanism depending from the supplemental frame, and a pair of hand chain wheels located adjacent to each other and one connected with a trolleying wheel of the main frame and the other with a trolleying wheel of the supplemental frame.

15. The combination, with a main frame, rectangular in form, four pairs of wheels carried thereby, a supplemental frame, rectangular in form, an arcuate trackway and wheels on radial axes connecting the supplemental frame with the main frame, a shaft parallel with the axis of the last mentioned wheels and geared with them for swinging the supplemental frame, and a shaft parallel with the axis of the main wheels and geared with some of them for shifting the crane structure.

16. The combination of a rectangular frame, supporting wheels carried thereby adjacent to the four corners, a through shaft connected with the wheels at opposite ends of the frame, a supplemental frame, connected with the main frame by means of wheels on one of said members and a trackway on the other whereby the supplemental frame is suspended below the main frame, a shaft connected with a pair of the supplemental wheels for turning said supplemental frame, and hoisting mechanism depending from the supplemental frame.

17. The combination of a main frame, supporting wheels in pairs at the ends of the frame adapted to ride on the lower flanges of an overhead I-beam support, a curved trackway carried by the main fame, a substantially rectangular supplemental frame having pairs of wheels mounted on radial axes and riding on lower flanges of said trackway, sheaves carried at the four corners of the supplemental frame, cables extending over said sheaves, and means for winding in said cables.

18. The combination of a main frame carrying supporting wheels and a trackway having at least portions which are circular, a supplemental frame having a plurality of sets of wheels mounted on radial axes riding on such circular portions, a drive shaft for rotating one of said sets, sheaves carried by the supplemental frame beyond said wheels, cables extending over the sheaves, and means for winding in the cables.

19. The combination, with a main frame having supporting wheels, a supplemental frame connected with the main frame so as to turn about a center thereon and having diagonal members, wheels secured to said diagonal members and riding on a circular trackway, means for rotating one of said last mentioned wheels, sheaves carried by said supplemental frame, cables extending over said sheaves, and means for winding said cables.

20. The combination, with a main frame having supporting wheels, a trackway carried by the main frame and having portions each of which are parts of the same circle, a supplemental frame having diagonal members, wheels secured to said diagonal members and riding on a circular trackway, sheaves carried by the diagonal members beyond the wheels carried thereby, cables extending over said sheaves, and means for winding said cables.

21. The combination of a main frame, supporting wheels carried thereby, a trackway carried by the main frame, a substantially rectangular supplemental frame having wheels riding on the trackway, sheaves mounted on the supplemental frame, raising cables extending over said sheaves, and mechanism mounted at one of the corners of the supplemental frame and geared with the adjacent wheels of the supplemental frame for turning that frame on the main frame.

22. The combination of a main frame, supporting wheels carried thereby, a trackway carried by the main frame, a supplemental frame beneath the main frame consisting of a rectangular skeleton structure having diagonal bars, wheels mounted on the diagonal bars riding on the trackway, sheaves mounted at the corners of the supplemental frame, raising cables extending over said sheaves and mechanism mounted at one of the corners of the supplemental frame and geared with the adjacent wheels of the supplemental frame for turning that frame on the main frame.

23. The combination of a main frame, a supplemental frame carried thereby and adapted to turn about a vertical axis, wheels carried by the supplemental frame, means for rotating one of said wheels, four sheaves carried by the supplemental frame, cables extending over said sheaves, a pair of aligned winding drums on the supplemental frame onto each of which a pair of said cables run, and motor mechanism connected with both drums.

24. The combination of a frame, four sheaves carried thereby at the four corners of a rectangle, four cables extending over the sheaves, a pair of drums onto each of which two of said cables extend, shafts for said drums, a gear wheel connected with both shafts, and a motor mechanism geared with said gear wheel.

25. The combination of a traveling frame having a trackway, a substantially rectangular supplemental frame having wheels riding on said trackway, four sheaves carried at the four corners of the supplemental frame, cables extending over said sheaves, two drums from each of which two of the cables run, a pair of shafts leading inwardly from said drums to a common gear, and motor mechanism intermediate the drums for rotating said gear.

26. The combination of a traveling frame having supporting wheels and carrying a trackway curved about a center, means for driving one of said wheels, a substantially rectangular supplemental frame having wheels riding on said trackway, means for rotating one of the last mentioned wheels, four sheaves carried at the four corners of the supplemental frame, cables extending over said sheaves, two drums from each of which two of the cables run, a pair of shafts leading inwardly from said drums to a common gear, and mechanism for rotating said gear.

27. The combination of a rectangular frame, wheels carried thereby in pairs substantially at the corners of the frame and adapted to ride on the lower flanges of overhead I-beam trackways, means for rotating one of said wheels, a trackway curved about a center carried by the frame and having lower flanges, a rectangular supplemental frame beneath the frame first mentioned and having wheels riding on said flanges, means for rotating one of the last mentioned wheels, cables depending from points adjacent to the four corners of the supplemental frame, and mechanism located intermediately on the supplemental frame for winding in said cables.

28. The combination, with I-beam trackways, of a main frame rectangular in form, four pairs of wheels carried thereby, each pair having wheels on opposite sides of the corresponding trackway, a supplemental frame rectangular in form, a curved trackway carried by the main frame, wheels on radial axes carried by the supplemental frame and riding on said main frame trackway, a shaft parallel with the axes of the last mentioned wheels, and geared with some of them for swinging the supplemental frame, a shaft parallel with the axis of the main wheels and geared with some of them for shifting the crane structure, and hand chain wheels on said two shafts adapted to be adjacent to the same corner of the structure.

In testimony whereof, I hereunto affix my signature.

BENJAMIN F. FITCH.